United States Patent [19]

Tsuboi et al.

[11] Patent Number: 4,881,186
[45] Date of Patent: Nov. 14, 1989

[54] APPARATUS FOR MEASURING INJECTION SPEED OF DIE CAST MACHINES

[75] Inventors: Hiroyuki Tsuboi; Hiroshi Sugiyama, both of Zama, Japan

[73] Assignee: Toshiba Kikai Kabushiki Kaisha, Tokyo, Japan

[21] Appl. No.: 208,838

[22] Filed: Jun. 14, 1988

Related U.S. Application Data

[63] Continuation of Ser. No. 782,980, Oct. 2, 1985, abandoned, which is a continuation-in-part of Ser. No. 467,937, Feb. 18, 1983, abandoned.

[30] Foreign Application Priority Data

Feb. 23, 1982 [JP] Japan .................................. 57-26876
Feb. 23, 1982 [JP] Japan .................................. 57-26874
Feb. 23, 1983 [JP] Japan .................................. 57-26873

[51] Int. Cl.⁴ ..................... B22D 17/32; G01P 3/48; G06F 15/46
[52] U.S. Cl. ............................. 364/565; 364/571.01; 364/476; 164/457; 164/155; 164/157; 73/3; 264/40.1; 425/135; 425/145; 425/149
[58] Field of Search ............... 364/468, 476, 565, 558, 364/571.01, 571.03, 571.04; 425/135, 145, 149; 264/40.1; 164/155, 157, 457; 73/1 R, 3, 4 R

[56] References Cited

U.S. PATENT DOCUMENTS

| 3,878,375 | 4/1975 | Mickoroski | 364/468 |
| 3,899,664 | 8/1975 | Bencini et al. | 364/565 |
| 3,941,534 | 3/1976 | Hunkar | 425/145 |
| 4,023,466 | 5/1977 | Strassheimer | 425/145 |
| 4,094,940 | 6/1978 | Hold | 364/476 |
| 4,120,922 | 10/1978 | Lemelson | 264/40.7 |
| 4,161,380 | 7/1979 | Bishop | 425/145 |
| 4,222,725 | 9/1980 | Rodgers | 425/145 |
| 4,252,174 | 2/1981 | Miki et al. | 164/457 |
| 4,304,263 | 12/1981 | Choate | 364/476 |
| 4,331,262 | 5/1982 | Snyder et al. | 364/571.04 X |
| 4,380,801 | 4/1983 | Motomura et al. | 364/565 |
| 4,469,164 | 9/1984 | Ishikawa et al. | 164/457 |
| 4,488,589 | 12/1984 | Moore et al. | 164/155 |
| 4,490,804 | 12/1984 | Martinsons | 364/571.04 |
| 4,558,421 | 12/1985 | Shriver | 364/472 |
| 4,559,991 | 12/1985 | Motomura et al. | 164/155 |
| 4,581,713 | 4/1986 | Fennel | 364/565 |
| 4,586,560 | 5/1986 | Ikeya et al. | 164/155 |
| 4,597,048 | 6/1986 | Mazur et al. | 164/155 X |
| 4,610,831 | 9/1986 | Mihara | 164/567 |
| 4,674,053 | 6/1987 | Bannai et al. | 364/476 |
| 4,695,237 | 9/1987 | Inaba | 364/476 X |
| 4,698,991 | 10/1987 | Kirii et al. | 364/476 X |
| 4,720,807 | 1/1988 | Ferran et al. | 364/558 |
| 4,735,225 | 4/1988 | Huveteau | 73/3 |
| 4,761,539 | 8/1988 | Carmean | 364/571.04 X |
| 4,774,675 | 9/1988 | Kagawa | 364/558 |

FOREIGN PATENT DOCUMENTS 58-122165 7/1983 Japan .................................. 164/155
2105081 3/1983 United Kingdom ................ 364/476

Primary Examiner—Parshotam S. Lall
Assistant Examiner—Joseph L. Dixon
Attorney, Agent, or Firm—Koda & Androlia

[57] ABSTRACT

In apparatus for measuring injection speed of a die cast machine, there are provided a pulse generator responsive to a movement of an injection plunger for producing a pulse signal, a detector for detecting a width of the pulse signal to produce pulse width data, a memory device successively storing the pulse width data between commencement and termination of injection, and an arithmetic operation circuit for calculating an average speed in a predetermined high speed section of a stroke of the injection plunger based on pulse width data stored in the memory device.

1 Claim, 7 Drawing Sheets

FIG. 6
PRIOR ART
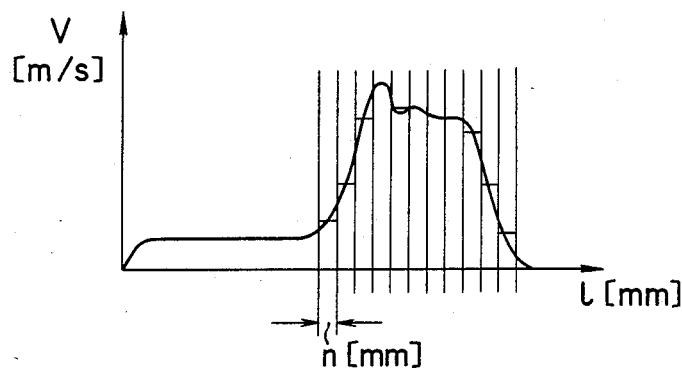
FIG. 7a
PRIOR ART
FIG. 7b
PRIOR ART
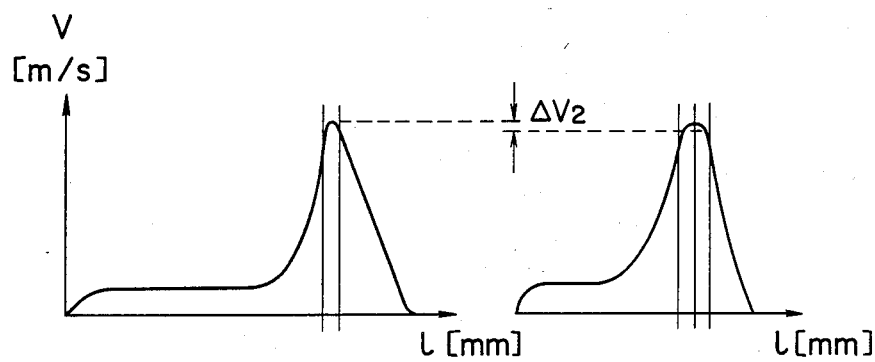

APPARATUS FOR MEASURING INJECTION SPEED OF DIE CAST MACHINES

CROSS REFERENCE TO A RELATED APPLICATION

This is a continuation of application Ser. No. 782,980, filed Oct. 2, 1985 now abandoned which application is a continuation-in-part of our copending application Ser. No. 467,937, filed Feb. 18, 1983, now abandoned.

BACKGROUND OF THE INVENTION

This invention relates to apparatus for measuring injection speed of a plunger of a die cast machine.

Usually, for the purpose of supervising the casting conditions of a die cast machine, the high injection speed at the injection step is measured. According to prior art injection speed measuring apparatus, an average speed is measured or an instantaneous speed at a portion of a high speed section is measured.

More particularly, according to the apparatus for measuring the average speed, an average speed $\beta$ in a section A is measured as shown in FIG. 1. As a consequence, the measured average speed $\beta$ is substantially smaller than the highest injection speed $\alpha$ wanted to know.

In apparatus for measuring an instantaneous speed, positions $l_1$ and $l_2$ between which the injection speed reaches a predetermined high speed are set for measuring an average speed in a section between positions $l_1$ and $l_2$, as shown in FIG. 2. With this apparatus, however, it is necessary to set the positions $l_1$ and $l_2$ in a region in which the injection speed becomes a predetermined high speed. Accordingly, where the injection speed varies as shown in FIGS. 3a and 3b with respect to the direction 1 of the plunger movement, the measured maximum speed varies greatly as shown by $\Delta V_1$.

According to other injection speed measuring apparatus, the peak value of an analog waveform regarding the injection speed is held so as to measure the peak value thus held. Alternatively, an injection speed waveform is divided into a plurality of sections to obtain average speeds of respective sections so as to measure the highest one.

According to the apparatus for measuring the peak value held, as shown in FIG. 4, for example, when holding the peak value of the analog waveform of the injection speed there is a fear of holding the peak value $V_p$ of the surge component, thus measuring a speed higher than an actual maximum speed $V_{max}$.

In apparatus for measuring the average speed in a predetermined section, it is necessary to preset a measuring section in which the injection speed reaches a maximum speed, as shown in FIG. 5. However, when the injection speed characteristic varies as shown by a dotted line curve, the preset measuring section varies, whereby the measured value of the maximum injection speed varies greatly.

In apparatus in which the waveform of the injection speed is divided into a plurality of sections to obtain average speeds i respective sections, a substantially desired maximum injection speed can be obtained as shown in FIG. 6. However, when the peak of the maximum injection speed is pointed as shown in FIG. 7a or rounded as shown in FIG. 7b, even when the maximum speed is the same, the measured speed varies greatly.

SUMMARY OF THE INVENTION

It is an object of this invention to provide apparatus for accurately and quickly measuring an optimum injection speed with a simple construction.

Another object of this invention is to provide apparatus for controlling an injection valve in accordance with the injection speed thus determined.

According to this invention there is provided apparatus for measuring an injection speed of a die cast machine comprising: pulse generating means responsive to a movement of an injection plunger over a unit length for generating a pulse signal; detecting means provided with a clock pulse generator for detecting a width of the pulse signal according to a number of the clock pulses generated in a time interval corresponding to the width of the pulse signal; memory means for successively storing the numbers of the clock pulses corresponding to respective unit lengths between commencement and termination of injection in one stroke of the injection plunger; and an arithmetic operation unit for figuring out a maximum average injection speed by using each number of clock pulses stored in the memory means.

According to a modified embodiment of this invention, there is provided apparatus for measuring an injection speed of a die cast machine comprising pulse generating means responsive to a movement of an injection cylinder over a unit length for generating a pulse signal; detecting means provided with a clock pulse generator for detecting the width of the pulse signal according to the number of the clock pulses generated in a time interval corresponding to the width of the pulse signal; first memory means having N (an integer) memory areas each successively storing the number (PSi) of the clock pulses corresponding to each unit length over an interval between commencement and termination of injection in one stroke of the injection plunger; and an arithmetic operation unit for figuring out a maximum average injection speed, the arithmetic operation unit including second memory means for storing a sum of the clock pulses corresponding to consecutive K (an integer) unit lengths in the first memory means; means for calculating a first sum $$\left( \sum_{i=1}^{i=K} PSi \right)$$

of clock pulses stored in successive memory areas of 1 to K (where K<N) of the first memory means; means for storing the first sum in the second memory means; means for calculating a second sum $$\left( \sum_{i=2}^{i=K+1} PSi \right)$$

of the numbers of clock pulses respectively stored in the memory areas 2 to K+1 of the first memory means; means for subtracting the second sum from the first sum and for replacing the content of the second memory means with the second sum $$\left( \sum_{i=2}^{i=K+1} PSi \right)$$

when the result of the subtraction is positive; and means for repeating the subtraction operation by sequentially incrementing suffix i by one until the suffix reaches N, whereby a maximum average injection speed at each K unit length is given by the sum remaining in the second memory means.

BRIEF DESCRIPTION OF THE DRAWINGS

In the accompanying drawings:

FIGS. 4, 5 and 6 are characteristics showing other prior art injection speed measuring apparatus;

FIGS. 7a and 7b are graphs showing a measurement error which occurs when the apparatus shown in FIG. 6 is used;

DESCRIPTION OF THE PREFERRED EMBODIMENTS

Figure 1:
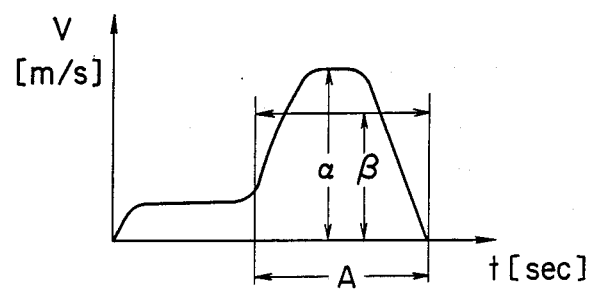
FIGS. 1 and 2 are characteristic curves showing prior art methods of measuring the high injection speed.
Figure 2:
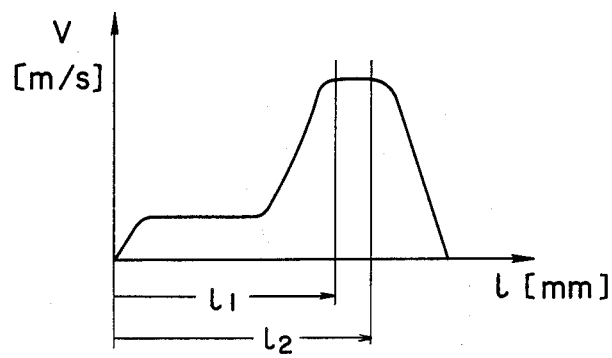
Figure 3A:
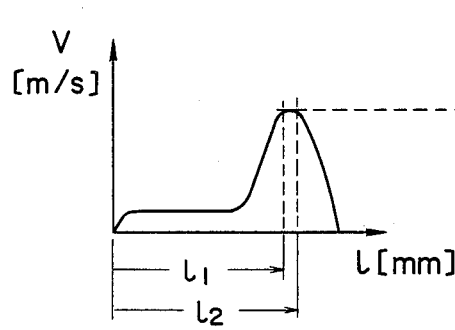
FIGS. 3a and 3b are characteristics showing a measurement error when the method shown in FIG. 2 is used.
Figure 3B:
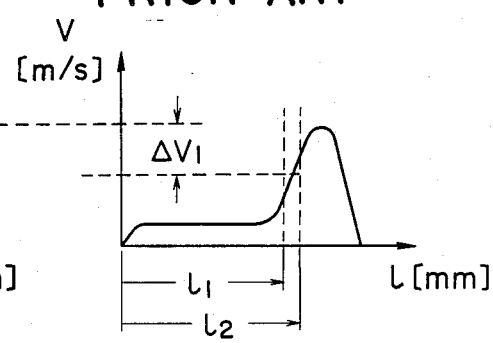
Figure 4:
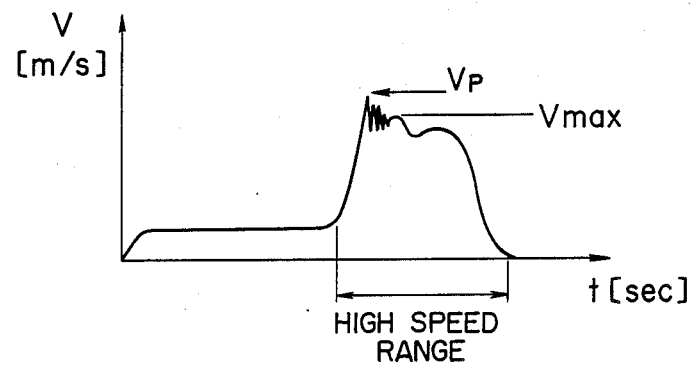
Figure 5:
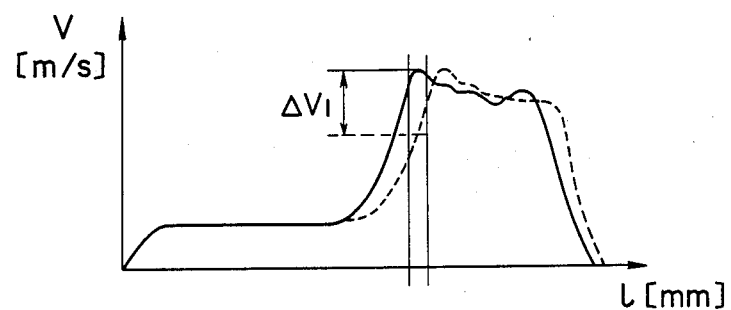
Figure 8:
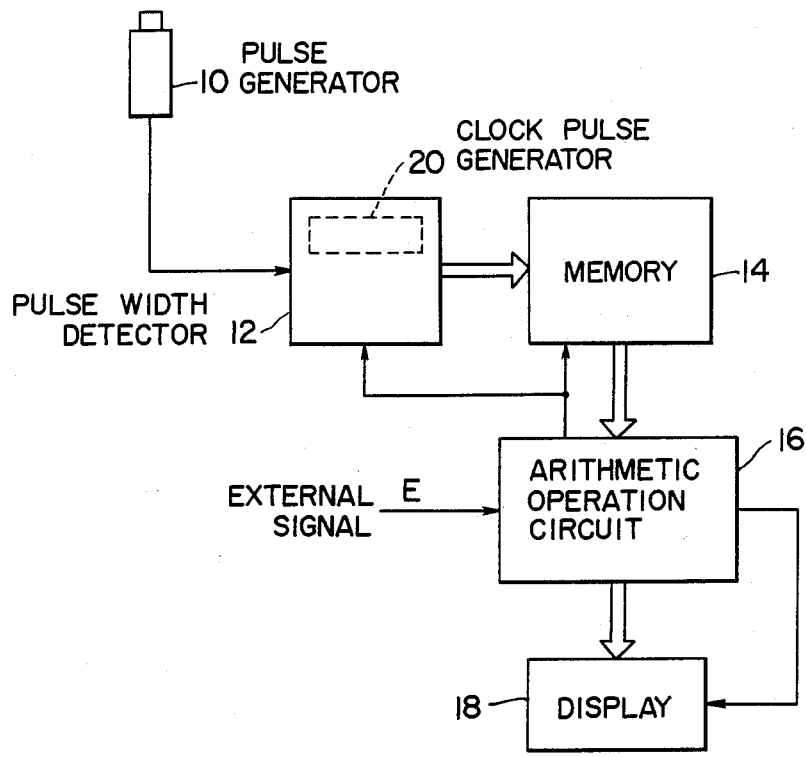
FIG. 8 is a block diagram showing one embodiment of this invention.

A preferred embodiment of this invention shown in FIG. 8 comprises a pulse generator 10, a pulse width detector 12 which detects the pulse width of the pulse signal generated by the pulse generator 10 in accordance with a clock pulse generated by a clock pulse generator 20, a memory device 14 storing the pulse width data detected by the pulse width detector 12, an arithmetic operation circuit 16 that calculates the high injection speed based on the data stored in the memory device 14, and a display device 18 displaying the high injection speed calculated by the arithmetic operation circuit 16.

The apparatus shown in FIG. 8 measures the high injection speed according to the following procedures.

Figure 9:
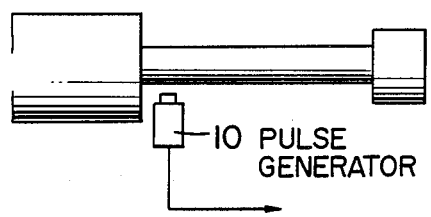
FIG. 9 is a side view showing the location of a pulse generator.
Figure 10:
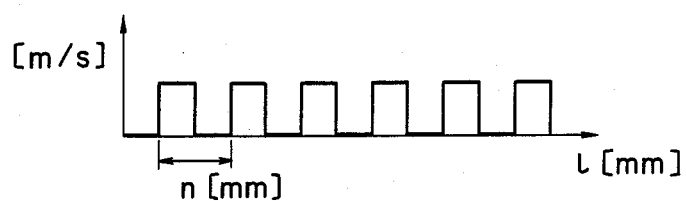
FIG. 10 shows a pulse train generated by the pulse generator shown in FIGS. 8 and 9.

The pulse generator 10 is disposed near the injection plunger as shown in FIG. 9 for generating a pulse each time the injection plunger moves a unit length n (mm) as shown in FIG. 10. The pulse thus generated is sent to the pulse width detector 12 in which the pulse width is digitally detected by a clock pulse generated by the clock pulse generator 20, in other words, the pulse width data is defined as the number PS of clock pulses counted during each unit length. The pulse width data thus detected are sequentially stored in the memory device 14. The arithmetic operation circuit 16 generates signals which control pulse width detector 12, memory device 14 and display device 18 in accordance with an external signal E.

Figure 11:
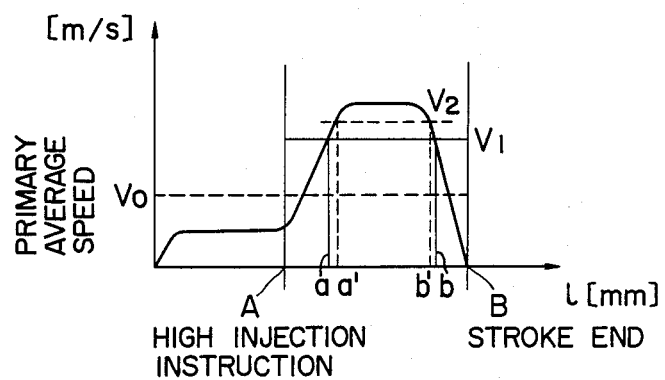
FIG. 11 is a graph showing a method of obtaining an average speed in a high speed section.
Figure 12:
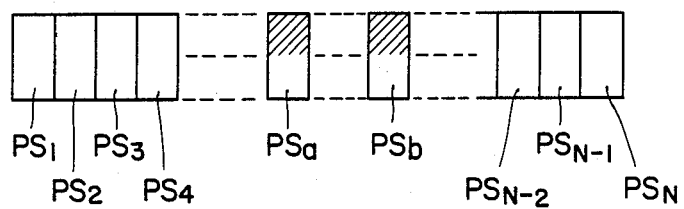
FIG. 12 shows the content of a memory device storing the pulse width data.

Thus, the arithmetic operation circuit 16 judges the injection initiation under the control of the external signal E and sequentially stores the pulse width data in the memory device 14. Thereafter, the arithmetic operation circuit 16 judges the termination of the injection in accordance with the external signal E to calculate the high injection speed in the following manner based on the pulse width data stored in the memory device 14. For convenience of description, it is assumed that all pulse width data stored in the memory device are converted into speed V as shown in FIG. 11. More particularly, the speed V corresponding to each unit length n (mm) is defined as n/PSi (mm/sec.), where the suffix i is a number corresponding to each unit length in the direction of the stroke of the plunger.

In the following steps, a term "high speed section" means a range between a position at which a high injection speed is instructed to the machine and the stroke end position.

(1) A primary average speed $V_1$ (mm/sec.) can be obtained by dividing the distance $\overline{AB}$ between points A and B in the high speed section with a time interval required for the plunger to move from position A to position B as shown in FIG. 11.

(2) The pulse width data sequentially written into the memory device 14 are scanned in a direction opposite to the order of writing and then scanned in the same direction as the order of writing to obtain points a and b, the speed values corresponding to points a and b being represented by $V_1$ as shown in FIG. 11.

(3) An average speed (secondary average speed $V_2$) is determined based on the stored speed data between points a and b.

(4) Procedures 1-3 are repeated by using the secondary average speed $V_2$.

(5) If desired, the procedure (4) is repeated to measure the high injection speed in an optimum section.

The high injection speed calculated in the arithmetic operation circuit 16 is displayed on the display device 18.

Thus, according to this invention, since the high speed section can be detected adequately, the high injection speed can be measured at a high accuracy without errors caused by variations in the injection speed characteristics. Moreover, the apparatus of this invention can readily be constructed by using a microcomputer having memory, calculation, and control performances.

Figure 13:
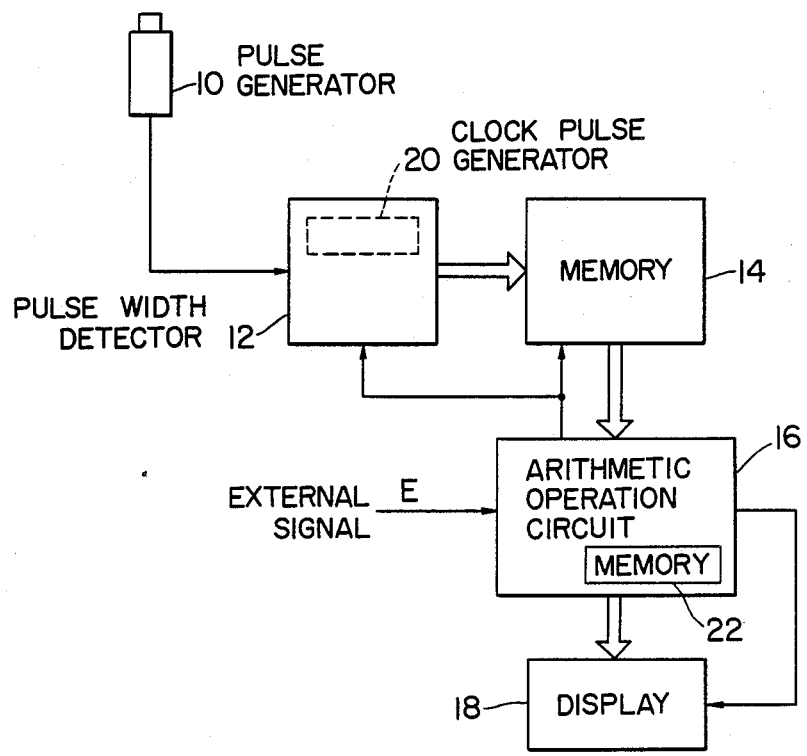
FIG. 13 shows a modification of the circuit shown in FIG. 8.

FIG. 13 shows a modification of the circuit shown in FIG. 8. This modification is different from the circuit shown in FIG. 8 in that a memory device 22 is incorporated into the arithmetic operation circuit 16 and determines the high injection speed according to the following procedures.

Figure 15:
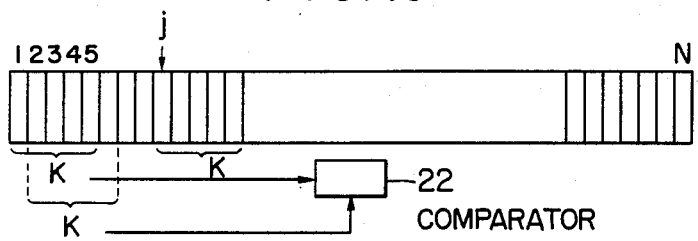
FIG. 15 is a diagram for explaining the operation of the modification shown in FIG. 13.

(1) The sum of the number of clock pulses PSi (stored in the memory device 14) at respective unit lengths between the start position (i=1) and the Kth position of the entire plunger stroke which is divided into N (an integer) unit lengths [n(mm)] as shown in FIG. 15 is determined, and the $$\left( \sum_{i=1}^{i=K} PSi \right)$$

is stored in the memory device 22.

(2) Then the sum $$\left( \sum_{i=2}^{i=K+1} PSi \right)$$

of respective unit lengths (corresponding to the number of clock pulses between i=2 and i=K+1) is determined.

(3) If $$\left( \sum_{i=1}^{i=K} PSi - \sum_{i=2}^{i=K+1} PSi \right) > 0,$$

the content of the memory device 22 is replaced by the sum $$\left( \sum_{i=2}^{i=K+1} PSi \right).$$

(4) In the same manner procedures (1)–(3) are repeated until i becomes N to determine the sum finally remaining in the memory device 22, the sum representing the maximum average injection speed in which the interval in a continuous section K is utilized as a unit.

Suppose now that a sum $$\left( \sum_{i=j}^{i=j+K} PSi \right)$$

between i=j and i=j+K remains in the memory device 22, $$V(\text{mm/sec.}) = \frac{K \cdot N}{\sum_{i=j}^{i=j+K} PSi} \text{ (mm/sec.)}$$

where $j + K \leq N$.

The maximum injection speed thus calculated is displayed on the display device 18.

This modification enables to measure the maximum injection speed.

In the operation of an injection machine, the operator measures the injection speed with a measuring instrument or visual feeling and then manually controls the degree of opening of an injection valve to be suitable for the measured injection speed. However, manual control of the valve opening results in errors and cast products of poor quality.

According to this invention, the injection speed measured by the apparatus shown in FIG. 8 or 13 is used to control the degree of opening of the injection valve.

Figure 14:
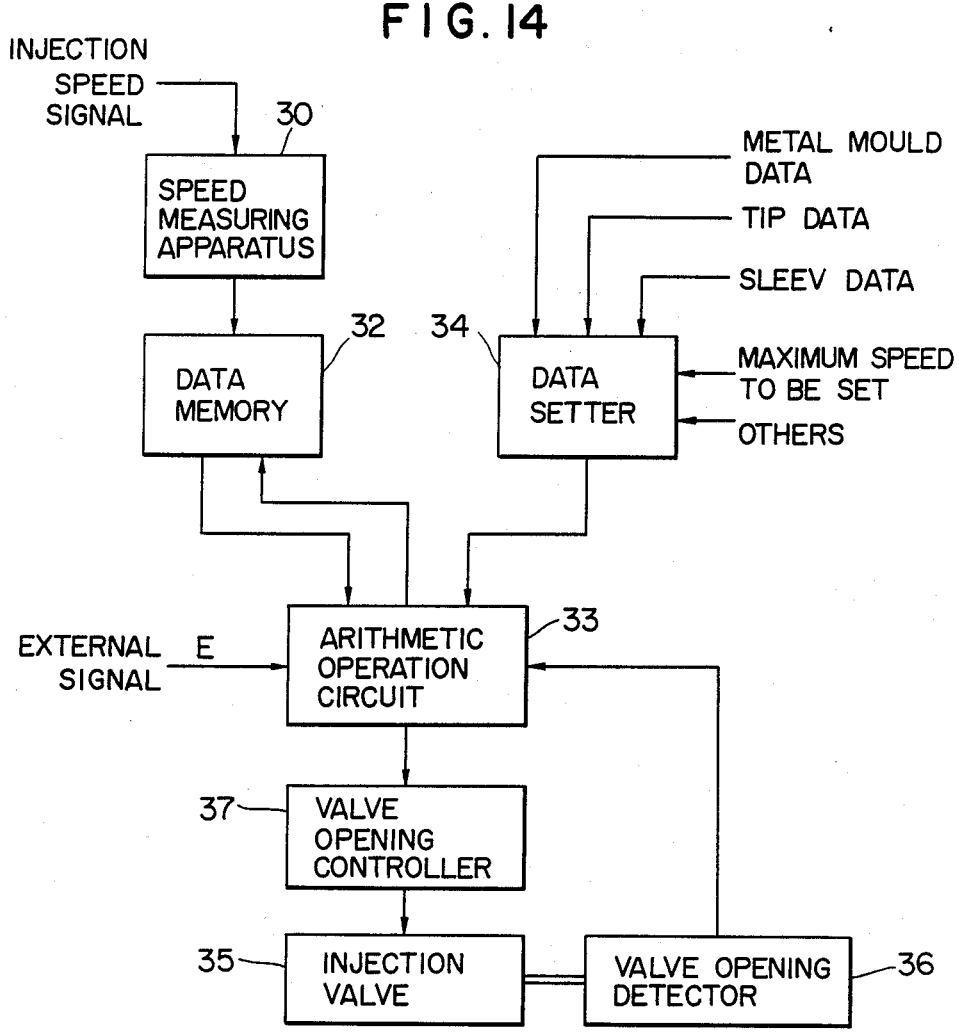
FIG. 14 is a connection diagram showing apparatus for controlling the injection speed by utilizing the high injection speed measured by the apparatus shown in FIG. 8.

In FIG. 14, the speed measuring apparatus shown in FIG. 8 or 13 is designated by a reference numeral 30. The injection valve control apparatus shown in FIG. 14 further comprises a memory device 32 storing the speed data measured by the speed measuring apparatus 30, a data setter 34 setting such data regarding a set value of the injection speed, a metal mould, a tip, a sleeve, cast products, etc., a valve opening detector 36 for detecting the degree of opening of an injection valve 35, an arithmetic operation circuit 33 which calculates the degree of opening of the injection valve 35 based on the data stored in the data memory device 32, the data set by the data setter 34, and the data detected by the valve opening detector 36, and a valve opening controller 37 for controlling the degree of opening of the injection valve 35 in accordance with the result of calculation of the arithmetic operation circuit 33.

The degree of opening of the injection valve and hence the injection speed are controlled in the following manner.

At first various data described above are set in the data setter 34. Based on these data the arithmetic operation circuit 33 calculates a set value of the valve opening which provides a desired maximum injection speed. The calculation can be made by utilizing suitable equations or a table (stored in a memory device) prepared by utilizing actual data. Then the valve opening controller 37 adjusts the injection valve 35 to the degree of opening calculated by the arithmetic operation circuit 33. At this time, the degree of adjusting the injection valve 35 is detected by feeding back the degree of opening detected by the valve opening detector 36 to the arithmetic operation circuit 33.

When the injection operation is started, the injection speed measuring apparatus 30 detects the maximum injection speed at each stroke to store the measured speed data in the memory device 32. Then the arithmetic operation circuit 33 calculates an average value of each maximum speed during injection operations of M (integer) times based on the speed data stored in the memory device 32, calculates the difference between the average maximum value and the value set by the data setter 34, and then corrects already calculated degree of opening of the injection valve, whereby the degree of opening of the injection valve 35 is corrected by the valve opening controller 37.

After the Mth injection the arithmetic operation circuit 33 calculates the difference between the detected speed and the speed set in the data setter 34 and corrects the degree of opening of the injection valve at each injection stroke.

It is desirable to preset an allowance for the difference to prevent hunting.

As above described according to this embodiment, it is possible to always provide a desired degree of injection valve opening and hence a preset injection speed thereby forming cast products having uniform high quality. Various component elements shown in Fig. 14 can be fabricated as an integrated circuit.

What is claimed is:

1. Apparatus for measuring an injection speed of a die cast machine comprising:
   pulse generating means responsive to a movement of an injection plunger over a unit length for generating a pulse signal;
   detecting means provided with a clock pulse generator for detecting a width of said pulse signal according to a number of said clock pulses generated in a time interval corresponding to said width of said pulse signal;
   first memory means having N (an integer) memory areas each successively storing the number (PSi) of said clock pulses corresponding to each unit length over an interval between commencement and termination of injection in one stroke of said injection plunger;
   an arithmetic operation unit for figuring out a maximum average injection speed, said arithmetic operation unit including:

second memory means for storing a sum of the clock pulses corresponding to consecutive K (an integer) unit lengths in said first memory means;

means for calculating a first sum $$\left( \sum_{i=1}^{i=K} PSi \right)$$

of pulses stored in successive memory areas of 1 to K (where K<N) of said first memory means;

means for storing said first sum in said second memory means;

means for calculating a second sum $$\left( \sum_{i=2}^{i=K+1} PSi \right)$$

of the numbers of clock pulses respectively stored in the memory areas 2 to K+1 of said first memory means;

means for subtracting said second sum from said first sum and for replacing the content of said second memory means with second sum $$\left( \sum_{i=2}^{i=K+1} PSi \right)$$

when a result of said subtraction is positive; and means for repeating said subtraction operation by sequentially incrementing suffix i by one until the suffix reaches N;

data setting means (34) for setting a desired maximum injection speed;

means for applying data stored in a data memory means (32) and data set by said data setting means to said arithmetic operation unit (33);

a value opening detector (36) for correcting a degree of opening of a hydraulic valve relative to a desired degree of injection valve opening;

means for feeding back a signal representing the degree of opening of said valve to said arithmetic operation unit; and wherein:

said maximum average injection speed at each K unit length is given by a sum remaining said second memory means; and said arithmetic operation unit includes means for calculating a difference between said desired maximum injection speed set by said data setting means and a calculated maximum injection speed.

* * * * *